United States Patent
Goel

(10) Patent No.: US 10,740,132 B2
(45) Date of Patent: Aug. 11, 2020

(54) SYSTEMS AND METHODS FOR UPDATING CONTAINERS

(71) Applicant: Veritas Technologies LLC, Mountain View, CA (US)

(72) Inventor: Vikas Goel, Sunnyvale, CA (US)

(73) Assignee: Veritas Technologies LLC, Santa Clara, CA (US)

(*) Notice: Subject to any disclaimer, the term of this patent is extended or adjusted under 35 U.S.C. 154(b) by 0 days.

(21) Appl. No.: 15/883,286

(22) Filed: Jan. 30, 2018

(65) Prior Publication Data

US 2019/0235897 A1    Aug. 1, 2019

(51) Int. Cl.
  *G06F 9/455*    (2018.01)
  *G06F 8/61*     (2018.01)
  *G06F 9/54*     (2006.01)

(52) U.S. Cl.
  CPC ............ *G06F 9/45558* (2013.01); *G06F 8/61* (2013.01); *G06F 9/45533* (2013.01); *G06F 9/45545* (2013.01); *G06F 9/545* (2013.01); *G06F 2009/45575* (2013.01)

(58) Field of Classification Search
  None
  See application file for complete search history.

(56) References Cited

U.S. PATENT DOCUMENTS

| | | |
|---|---|---|
| 5,956,028 A | 9/1999 | Matsui et al. |
| 7,702,866 B2 | 4/2010 | Beardsley et al. |
| 8,266,616 B1 | 9/2012 | Jacquot et al. |
| 8,869,140 B2 | 10/2014 | Todorova |
| 9,075,638 B2 | 7/2015 | Barnett et al. |
| 9,176,720 B1 * | 11/2015 | Day-Richter ............. G06F 8/63 |
| 9,203,862 B1 | 12/2015 | Kashyap et al. |
| 9,213,541 B2 | 12/2015 | Araya et al. |
| 9,256,467 B1 | 2/2016 | Singh et al. |
| 9,367,305 B1 | 6/2016 | Kumar et al. |

(Continued)

OTHER PUBLICATIONS

Apache Mesos, http://mesos.apache.org, last accessed Jan. 25, 2017.

(Continued)

*Primary Examiner* — Daxin Wu
(74) *Attorney, Agent, or Firm* — FisherBroyles, LLP

(57) ABSTRACT

The disclosed computer-implemented method for updating containers may include (i) identifying an application container that is instantiated from a static application container image, (ii) identifying ancillary code that is designed to modify execution of the application executing in the application container, (iii) packaging the ancillary code into a data volume container image to be deployed to the host system that hosts the application container, (iv) discovering, by the application container, a data volume container instantiated from the data volume container image on the host system, and (v) modifying, by the application container, the execution of the application executing in the application container with the ancillary code, without modifying the static application container image, at least in part by instantiating the application container with a pointer to the location of the data volume container that contains the ancillary code. Various other methods, systems, and computer-readable media are also disclosed.

20 Claims, 5 Drawing Sheets

(56) References Cited

U.S. PATENT DOCUMENTS

| | | |
|---|---|---|
| 9,396,061 B1 | 7/2016 | Nair |
| 9,785,643 B1 | 10/2017 | Patil et al. |
| 9,888,067 B1 | 2/2018 | Yemini et al. |
| 9,983,891 B1 | 5/2018 | Christensen |
| 10,073,974 B2 | 9/2018 | Hwang et al. |
| 10,127,030 B1 | 11/2018 | Mortman et al. |
| 10,169,023 B2 | 1/2019 | Ciano et al. |
| 10,216,455 B1 | 2/2019 | Schroeder et al. |
| 10,360,053 B1 | 7/2019 | Christensen et al. |
| 2002/0069399 A1 | 6/2002 | Miloushey et al. |
| 2002/0069400 A1 | 6/2002 | Miloushev et al. |
| 2002/0120924 A1 | 8/2002 | Miloushev et al. |
| 2003/0056205 A1 | 3/2003 | Miloushev et al. |
| 2003/0135850 A1 | 7/2003 | Miloushev et al. |
| 2004/0148367 A1 | 7/2004 | Takano et al. |
| 2005/0246357 A1 | 11/2005 | Geary et al. |
| 2006/0005189 A1 | 1/2006 | Vega et al. |
| 2008/0028379 A1 | 1/2008 | Stichnoth |
| 2009/0077422 A1 | 3/2009 | Khaladkar et al. |
| 2009/0210869 A1 | 8/2009 | Gebhart et al. |
| 2009/0265712 A1 | 10/2009 | Herington |
| 2011/0047525 A1 | 2/2011 | Castellanos et al. |
| 2011/0191537 A1 | 8/2011 | Kawaguchi et al. |
| 2011/0197188 A1 | 8/2011 | Srinivasan et al. |
| 2012/0005153 A1 | 1/2012 | Ledwich et al. |
| 2014/0181816 A1 | 6/2014 | Muller et al. |
| 2014/0201374 A1 | 7/2014 | Ashwood-Smith et al. |
| 2015/0032688 A1 | 1/2015 | Dayon et al. |
| 2015/0120928 A1 | 4/2015 | Gummaraju et al. |
| 2015/0269006 A1 | 9/2015 | Caufield et al. |
| 2015/0310209 A1 | 10/2015 | Zhang |
| 2015/0363181 A1 | 12/2015 | Alberti et al. |
| 2016/0098285 A1* | 4/2016 | Davis .................. G06F 9/45545 718/1 |
| 2016/0162320 A1 | 6/2016 | Singh et al. |
| 2016/0171222 A1 | 6/2016 | Panchbudhe et al. |
| 2016/0182315 A1 | 6/2016 | Salokanto et al. |
| 2016/0217176 A1 | 7/2016 | Haviv et al. |
| 2016/0359955 A1 | 12/2016 | Gill et al. |
| 2016/0378518 A1 | 12/2016 | Antony et al. |
| 2017/0060605 A1 | 3/2017 | Huang et al. |
| 2017/0083541 A1 | 3/2017 | Mann et al. |
| 2017/0115977 A1 | 4/2017 | Kim et al. |
| 2017/0154017 A1 | 6/2017 | Kristiansson et al. |
| 2017/0228246 A1 | 8/2017 | Kotha et al. |
| 2017/0235609 A1 | 8/2017 | Wires et al. |
| 2017/0242617 A1 | 8/2017 | Walsh et al. |
| 2017/0249469 A1 | 8/2017 | Goyal et al. |
| 2017/0264684 A1 | 9/2017 | Spillane et al. |
| 2017/0277524 A1* | 9/2017 | Bhat .......................... G06F 8/60 |
| 2017/0279797 A1 | 9/2017 | Cross, Jr. et al. |
| 2017/0315795 A1 | 11/2017 | Keller |
| 2017/0322966 A1 | 11/2017 | Tran et al. |
| 2017/0337054 A1 | 11/2017 | Parees et al. |
| 2017/0344292 A1 | 11/2017 | Sterin et al. |
| 2018/0004570 A1 | 1/2018 | Maupu et al. |
| 2018/0046457 A1 | 2/2018 | Branca |
| 2018/0060402 A1 | 3/2018 | Fabjanski et al. |
| 2018/0129479 A1* | 5/2018 | McPherson ......... G06F 11/3668 |
| 2018/0157505 A1 | 6/2018 | Kairali et al. |
| 2018/0336113 A1 | 11/2018 | Asawa et al. |

OTHER PUBLICATIONS

AWS Lambda, https://aws.amazon.com/lambda/, last accessed Jan. 25, 2017.
Docker container support, last accessed Jan. 25, 2017.
Dray—Docker Workflow Engine, http://dray.it/, last accessed Jan. 25, 2017.
Docker ETL Rest server github, https://github.com/bmamlin/docker-etl-rest-server, last accessed Jan. 25, 2017.
Docker Nifi github, https://github.com/jdye64/docker-nifi, last accessed Jan. 25, 2017.
Mesos/Chronos github, https://github.com/mesos/chronos, last accessed Jan. 25, 2017.
Apache Nifi for Docker, https://github.com/apiri/dockerfile-apache-nifi, last accessed Jan. 25, 2017.
Coho Data, https://www.cohodata.com/intel, last accessed Jan. 25, 2017.
Iron.io, https://www.iron.io/, last accessed Jan. 25, 2017.
Jenkins and Docker, https://www.cloudbees.com/continuous-delivery/jenkins-docker, last accessed Jan. 25, 2017.
Pachyderm.io, https://www.pachyderm.io/, last accessed Jan. 25, 2017.
Syncsort ETL, last accessed Jan. 25, 2017.
Talend and Docker, last accessed Jan. 25, 2017.
What is Docker?, https://www.docker.com/what-docker, last accessed Jan. 25, 2017.
Docker Swarm product overview, https://www.docker.com/products/docker-swarm, last accessed Feb. 28, 2017.
Kubernetes Basics, https://kubernetes.io/docs/tutorials/kubernetes-basics/, last accessed Feb. 28, 2017.
Attach a volume to a container while it is running; http://jpetazzo.github.io/2015/01/13/docker-mount-dynamic-volumes/, as accessed Feb. 23, 2017 (Jan. 13, 2015); Github.
Manage data in containers; https://docs.docker.com/engine/tutorials/dockervolumes/#/backup-restore-or-migrate-data-volumes, as accessed Feb. 23, 2017 (Sep. 3, 2016); Docker.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Understanding Volumes in Docker; http://container-solutions.com/understanding-volumes-docker/, as accessed Feb. 23, 2017 (Jul. 6, 2015); Container Solutions Amsterdam.
Docker mounting volumes on host; http://stackoverflow.com/questions/25311613/docker-mounting-volumes-on-host, as accessed Feb. 23, 2017 (Aug. 14, 2014); stackoverflow.
Understand images, containers, and storage drivers; https://docs.docker.com/engine/userguide/storagedriver/imagesandcontainers/, as accessed Feb. 23, 2017 (Nov. 7, 2015); Docker.
A Not Very Short Introduction to Docker; https://blog.jayway.com/2015/03/21/a-not-very-short-introduction-to-docker/, as accessed Feb. 23, 2017 (Mar. 21, 2015); jayway.
Use data volumes containers; https://getcarina.com/docs/tutorials/data-volume-containers!, as accessed Feb. 23, 2017 (Oct. 23, 2015); Rackspace.
What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker; as accessed Jan. 28, 2017.
Platform as a Service; https://en.wikipedia.org/wiki/Platform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; https://cloud.google.com/solutions/real-time/kubernetes-redis-bigquery; as accessed Jan. 28, 2017.
Operating-system-level virtualization; https://en.wikipedia.org/wiki/Operating-system-level_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/container-engine/docs/clusters/#what_is_a_container_cluster; as accessed Jan. 31, 2017.
Object Storage; https://en.wikipedia.org/wiki/Object_storage; as accessed Jan. 30, 2017.

(56) References Cited

OTHER PUBLICATIONS

Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.
Plugins_volume.md; https://github.com/docker/docker/blob/master/docs/extend/plugins_volume.md, as accessed on Feb. 14, 2017.
Ryan Schroeder et al.; Systems and Methods for Performing Storage Location Virtualization; U.S. Appl. No. 15/432,614, filed Feb. 14, 2017.
Kasireddy, Preethi, "A Beginner-Friendly Introduction to Containers, VMs and Docker," accessed at https://medium.freecodecamp.org/a-beginner-friendly-introduction-to-containers-vms-and-docker-79a9e3e119b, published on Mar. 4, 2016, pp. 21.
International Search Report and Written Opinion received for PCT Application Serial No. PCT/US2019/015740 dated Apr. 25, 2019, 15 pages.
Kang et al., "Container and Microservice Driven Design for Cloud Infrastructure DevOps", IEEE International Conference on Cloud Engineering (IC2E), 2016, pp. 202-211.

\* cited by examiner

SYSTEMS AND METHODS FOR UPDATING CONTAINERS

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers may reduce the processing requirements for each application, allowing a greater number of applications to be run on the same host. Containers can be used for anything from short-lived operations lasting minutes to long-lived operations lasting weeks or months, and can be configured to run a wide variety of applications in order to complete a wide variety of computing tasks.

Many traditional systems for container distribution make use of container images, static versions of the container code that are easily portable and that can be used to instantiate containers. Updating or otherwise modifying a container-based application that is generated from an image typically involves rebuilding the image and redistributing the new image to all the locations that host the container. Unfortunately, the process of rebuilding and redistributing an image can consume considerable computing resources and involve potentially undesirable delays. The instant disclosure, therefore, identifies and addresses a need for systems and methods for updating containers.

SUMMARY

As will be described in greater detail below, the instant disclosure describes various systems and methods for updating containers by distributing ancillary code in data volume containers that are discovered by the application containers.

In one example, a computer-implemented method for updating containers may include (i) identifying an application container that is instantiated from a static application container image and that isolates a user space of an application that executes within the application container from other software on a host system while sharing a kernel space with the other software, (ii) identifying ancillary code that is designed to modify execution of the application executing in the application container, (iii) packaging the ancillary code into a data volume container image to be deployed to the host system that hosts the application container, (iv) discovering, by the application container, a pointer to a location of a data volume container instantiated from the data volume container image on the host system, and (v) modifying, by the application container, the execution of the application executing in the application container with the ancillary code, without modifying the static application container image, at least in part by instantiating the application container with the pointer to the location of the data volume container that contains the ancillary code.

In one embodiment, discovering, by the application container, the pointer to the location of the data volume container instantiated from the data volume container image on the host system may include configuring, at the creation of the static application container image, the static application container image with a script that scans for new ancillary code upon the application container being instantiated from the static application container image and discovering, by the application container executing the script, the location of the data volume container. In one embodiment, configuring the static application container image with the script that scans for the new ancillary code may include configuring the script to scan a predetermined directory, packaging the ancillary code into the data volume container image to be deployed to the host system that hosts the application container may include configuring the data volume container image to instantiate the data volume container in the predetermined directory on the host system, and discovering, by the script, the ancillary code may include discovering the data volume container in the predetermined directory.

In one embodiment, discovering, by the application container, the pointer to the location of a data volume container instantiated from the data volume container image on the host system may include configuring a container platform that instantiates the application container on the host system with a script that scans for new ancillary data upon instantiation of the application container by the container platform. This embodiment may also include discovering, by the container platform executing the script while instantiating the application container, the location of the data volume container. In some examples, modifying, by the application container, the execution of the application executing in the application container with the ancillary code may include locating, by the application container, an installation script in a data volume within the data volume container and executing the installation script.

In some examples, instantiating the application container with the pointer to the location of the data volume container that contains the ancillary code may include restarting the application container. In one embodiment, the computer-implemented method may further include (i) restarting the application container with an additional pointer to a location of a new data volume container that contains additional ancillary code, (ii) discovering, by the application container, the location of the new data volume container, (iii) automatically rediscovering, by the application container, a pointer to a location of a data volume container instantiated from the data volume container image on the host system, and (iv) modifying, by the application container, execution of the application executing in the application container with the ancillary code and the additional ancillary code.

In one embodiment, the ancillary code may include a plugin to the application executing in the application container. Additionally or alternatively, the ancillary code may include a patch to the application executing in the application container. In one embodiment, discovering, by the application container, the pointer to the location of the data volume container on the host system may include creating a symbolic link between the location of the data volume container on the host system and a new location on the host system.

In one embodiment, the computer-implemented method may further include (i) identifying a first application container that hosts a first instance of the application and a second application container that hosts a second instance of the application, (ii) identifying additional ancillary code that is designed to modify the execution of the application, (iii) packaging the additional ancillary code into an additional data volume container image, (iv) discovering, by the first application container, a pointer to a location of an additional data volume container instantiated from the additional data volume container image, (v) modifying, by the first application container, the execution of the first instance of the application executing in the first application container with the additional ancillary code but not with the ancillary code, and (vi) modifying, by the second application container, the execution of the second instance of the application executing in the second application container with the ancillary code but not with the additional ancillary code.

In one embodiment, a system for implementing the above-described method may include (i) an identification module, stored in memory, that (a) identifies an application container that is instantiated from a static application container image and that isolates a user space of an application that executes within the application container from other software on a host system while sharing a kernel space with the other software and (b) identifies ancillary code that is designed to modify execution of the application executing in the application container, (ii) a packaging module, stored in memory, that packages the ancillary code into a data volume container image to be deployed to the host system that hosts the application container, (iii) a discovery module, stored in memory, that discovers, by the application container, a pointer to a location of a data volume container instantiated from the data volume container image on the host system, (iv) a modifying module, stored in memory, that modifies, by the application container, the execution of the application executing in the application container with the ancillary code, without modifying the static application container image, at least in part by instantiating the application container with the pointer to the location of the data volume container that contains the ancillary code, and (v) at least one physical processor that executes the identification module, the packaging module, the discovery module, and the modifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an application container that is instantiated from a static application container image and that isolates a user space of an application that executes within the application container from other software on a host system while sharing a kernel space with the other software, (ii) identify ancillary code that is designed to modify execution of the application executing in the application container, (iii) package the ancillary code into a data volume container image to be deployed to the host system that hosts the application container, (iv) discover, by the application container, a pointer to a location of a data volume container instantiated from the data volume container image on the host system, and (v) modify, by the application container, the execution of the application executing in the application container with the ancillary code, without modifying the static application container image, at least in part by instantiating the application container with the pointer to the location of the data volume container that contains the ancillary code.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
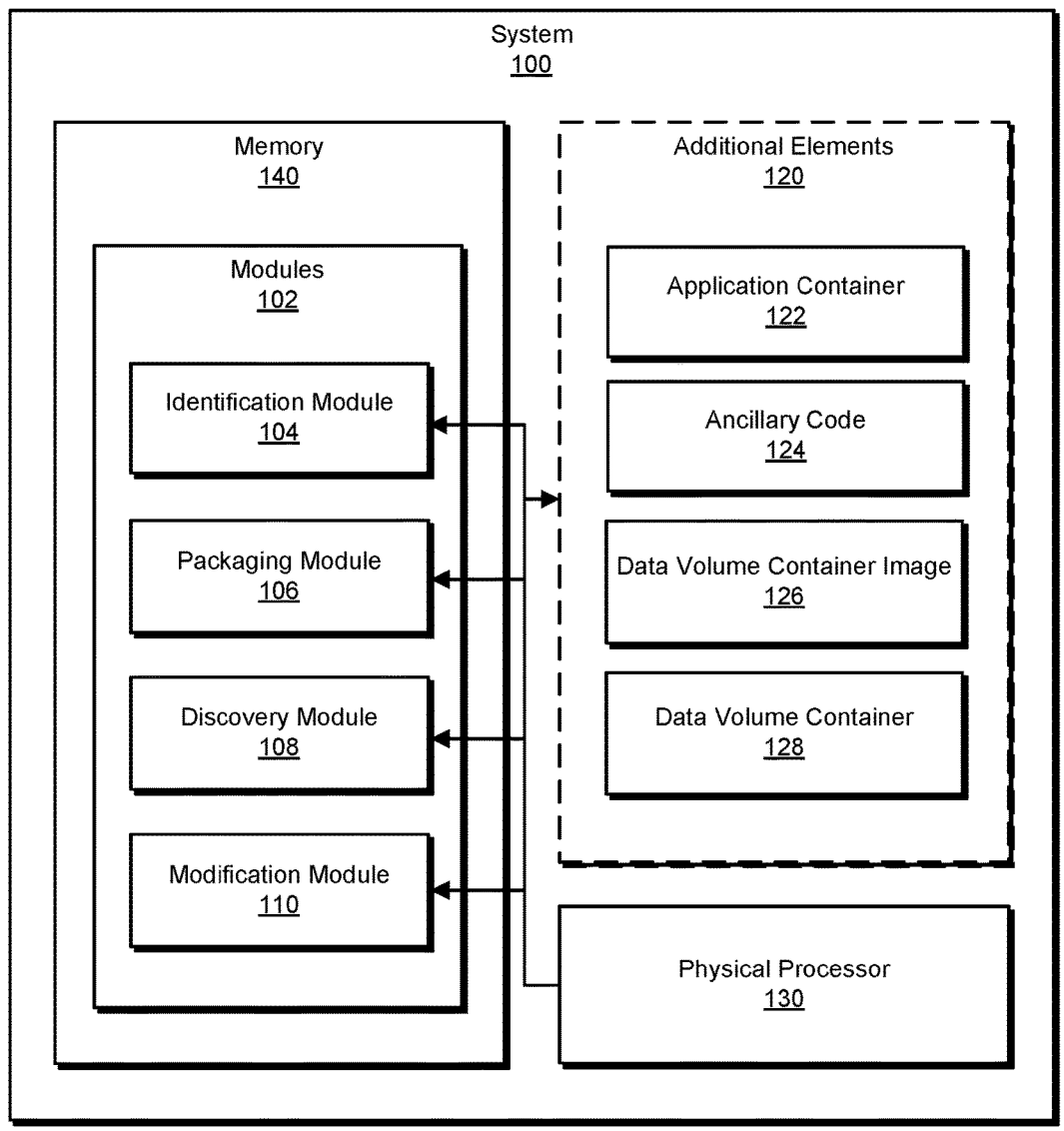
FIG. 1 is a block diagram of an example system for updating containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for updating containers. As will be explained in greater detail below, by configuring an application container image and/or a container platform to automatically discover data volume containers containing add-ons, hotfixes, plugins, and the like by searching for new ancillary code whenever an application container is instantiated, the various systems and methods described herein may be able to efficiently update application containers with new code with the minimum of user intervention and without requiring changes to the base application container image. Moreover, the systems and methods described herein may improve the functioning and/or performance of a computing device (such as a cloud server) by improving the functioning of applications executing within containers on the computing device and/or improving the efficiency with which updates are applied to application containers on the computing device. These systems and methods may also improve the field of virtualization by providing an efficient process for updating applications executing in virtualization containers and/or allowing the same application container image to be used in different contexts by streamlining the process for customizing the application container with ancillary code.

The following will provide, with reference to FIGS. 1, 2, 4, and 5, detailed descriptions of example systems for updating containers. Detailed descriptions of corresponding computer-implemented methods will also be provided in connection with FIG. 3.

FIG. 1 is a block diagram of example system 100 for updating containers. As illustrated in this figure, example system 100 may include one or more modules 102 for performing one or more tasks. For example, and as will be explained in greater detail below, example system 100 may include an identification module 104 that identifies an application container that is instantiated from a static application container image and that isolates a user space of an application that executes within the application container from other software on a host system while sharing a kernel space with the other software. In some examples, identification module 104 may also identify ancillary code that is designed to modify execution of the application executing in the application container. Example system 100 may additionally include a packaging module 106 that packages the ancillary code into a data volume container image to be deployed to the host system that hosts the application container. Example system 100 may also include a discovery module 108 that discovers, by the application container, a pointer to a location of a data volume container instantiated from the data volume container image on the host system. Example system 100 may additionally include a modifying module 110 that modifies, by the application container, the execution of the application executing in the application container with the ancillary code, without modifying the static application container image, at least in part by instantiating the application container with the pointer to the location of the data volume container that contains the ancillary code. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or host system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate updating containers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as application container 122, ancillary code 124, data volume container image 126, and/or data volume container 128. Application container 122 generally represents any type or form of virtualization platform capable of hosting an application. Ancillary code 124 generally represents any type or form of code that can be applied to an application and/or can modify the behavior of an application. Data volume container image 126 generally represents any type or form of code that can be used to instantiate a data volume container. Data volume container 128 generally represents any type or form of virtualization container capable of storing and/or executing ancillary code.

Figure 2:
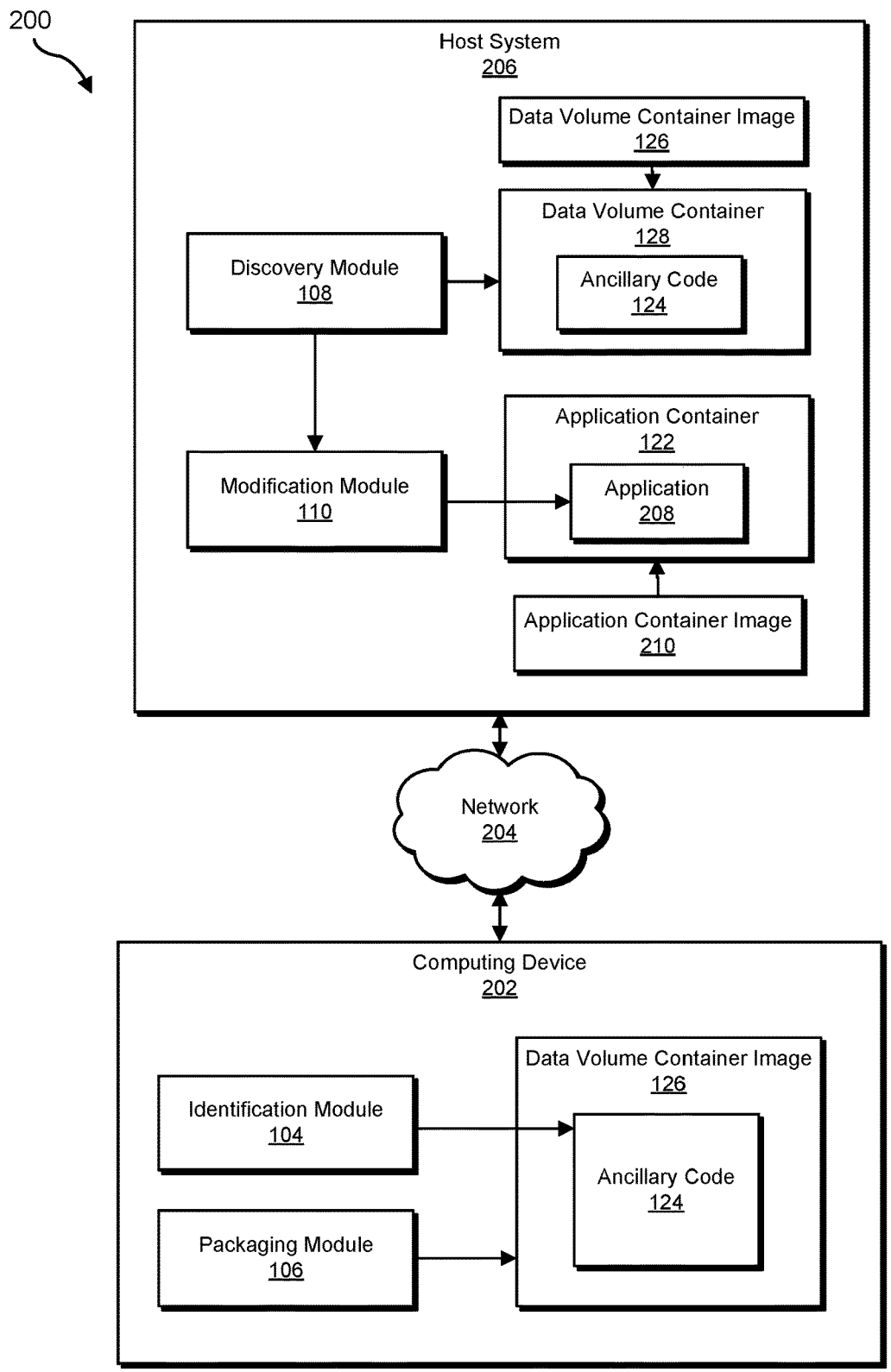
FIG. 2 is a block diagram of an additional example system for updating containers.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a host system 206 via a network 204. In one example, all or a portion of the functionality of modules 102 may be performed by computing device 202, host system 206, and/or any other suitable computing system. As will be described in greater detail below, one or more of modules 102 from FIG. 1 may, when executed by at least one processor of computing device 202 and/or host system 206, enable computing device 202 and/or host system 206 to update containers.

Computing device 202 generally represents any type or form of computing device capable of reading computer-executable instructions. In some embodiments, computing device 202 may be a personal computing device used by a developer. In other embodiments, computing device 202 may be a cloud server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Host system 206 generally represents any type or form of computing device that is capable of hosting one or more virtualization containers. In some embodiments, host system 206 may be a cloud server. Additional examples of host system 206 include, without limitation, storage servers, database servers, application servers, and/or web servers configured to run certain software applications and/or provide various storage, database, and/or web services. Although illustrated as a single entity in FIG. 2, host system 206 may include and/or represent a plurality of servers that work and/or operate in conjunction with one another.

Network 204 generally represents any medium or architecture capable of facilitating communication or data transfer. In one example, network 204 may facilitate communication between computing device 202 and host system 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Application 208 generally represents any type or form of executable code. Application container image 210 generally represents any type or form of code that can be used to instantiate an application container.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
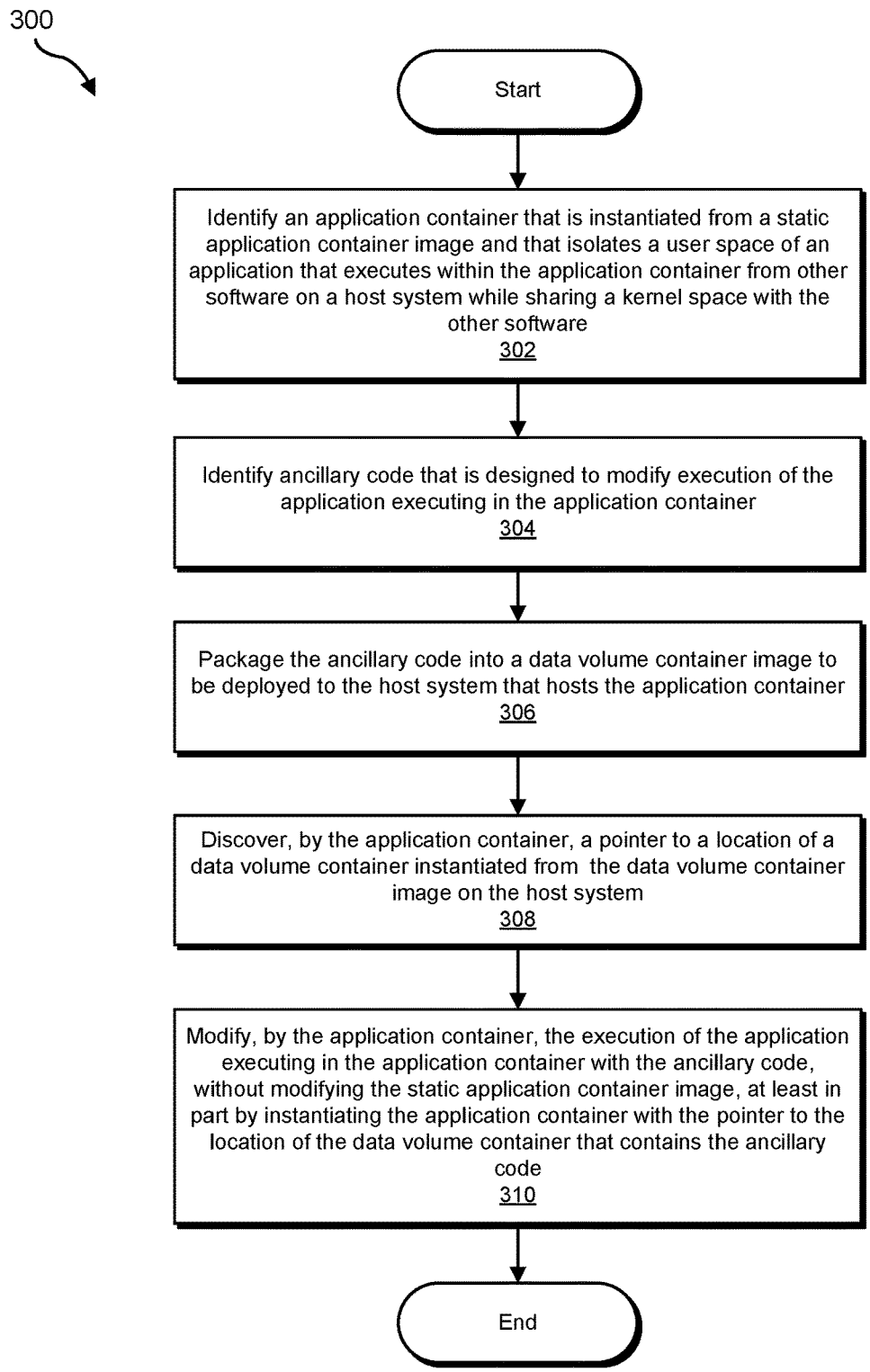
FIG. 3 is a flow diagram of an example method for updating containers.

FIG. 3 is a flow diagram of an example computer-implemented method 300 for updating containers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an application container that is instantiated from a static application container image and that isolates a user space of an application that executes within the application container from other software on a host system while sharing a kernel space with the other software. For example, identification module 104 may, as part of computing device 202 in FIG. 2, identify application container 122 that is instantiated from a static application container image 210 and that isolates a user space of application 208 that executes within application container 122 from other software on host system 206 while sharing a kernel space with the other software.

The term "application," as used herein, generally refers to any executable code that is capable of launching a process. In some embodiments, an application may be a piece of software. Additionally or alternatively, an application may be a script. In some examples, an application may be a standalone application. In other examples, an application may be a frontend for a larger system, such as an interface for a web application. In some examples, an application may include a collection of interoperating programs and/or executable objects. In one example, an application may be a backup, storage, and/or deduplication application.

The term "container," as used herein, generally refers to any type of virtual environment that does not include an entire operating system but does include enough computing resources to execute at least one process and/or application when supplemented by computing resources from an operating system of a host computing system. In some embodiments, the resources and/or processes within a container may be isolated from resources and/or processes outside the container. For example, a container may isolate user space of a deployment system from other software on the deployment system while sharing kernel space with the other software.

The term "user space," as used herein, generally refers to the portion of memory in a computing environment where application software executes. In some embodiments, user space may include libraries, graphics engines, device drivers for certain devices, and/or system daemons. The term "kernel space," as used herein, generally refers to the portion of memory in a computing environment reserved for executing an operating system kernel, kernel extensions, and device drivers. In contrast, virtualization environments that are not containers, such as virtual machines, may not share kernel space with other software. Other forms of application virtualization that are also not containers may share both kernel space and user space with other applications. In some embodiments, a container may execute only a single process and/or application, while in other embodiments, a container may execute multiple processes and/or applications. In some embodiments, a container may be a DOCKER container. The term "application container," as used herein, generally refers to a container that stores and/or hosts an application. In some examples, an application container may also host bundled components for an application.

The term "container image," as used herein, generally refers to a data object that stores data describing a container and/or data that can be reconstructed into an executing container but that is not itself an executing container. In some embodiments, a container image may be a compressed file that contains data necessary to execute the container. In some examples, a container image may be built from a parent container image. In some examples, a container image may be read-only from the perspective of a system that creates container instances from the container image. In some examples, one or more of the systems described herein may create multiple container instances from a single container image.

Identification module 104 may identify the application container in a variety of ways and/or contexts. For example, identification module 104 may identify the application container in response to receiving information that updates are available for the application that executes in the container. In another example, identification module 104 may identify the application container by searching for all containers that are currently hosting a particular application. Additionally or alternatively, identification module 104 may identify the application container in response to a user specifying the application container.

At step 304, one or more of the systems described herein may identify ancillary code that is designed to modify execution of the application executing in the application container. For example, identification module 104 may, as part of computing device 202 in FIG. 2, identify ancillary code 124 that is designed to modify execution of application 208 executing in application container 122.

The term "ancillary code," as used herein, generally refers to any code that is designed to modify the behavior of another application. In some embodiments, ancillary code may include an application that modifies the behavior of another application by supplying the application with parameters, restricting actions available to the application, intercepting messages to and/or from the application, and/or performing other actions. In other embodiments, ancillary code may not be a standalone application but may be code that is designed to be applied to an application. For example, ancillary code may be a hotfix, patch, plugin, update, or other code that is designed to fix a problem with and/or add functionality to an application. In some examples, ancillary code may include internal logic to update configuration parameters and/or process existing application data apart from installing new binaries and/or libraries. In some embodiments, ancillary code may include an installation script that creates binaries and/or libraries and/or makes configuration changes to an application.

Identification module 104 may identify the ancillary code in a variety of ways. In one example, the ancillary code may be an automatic update to the application and identification module 104 may identify the ancillary code via an update service for the application. In another example, a developer may specify the ancillary code to identification module 104. Additionally or alternatively, identification module 104 may identify the ancillary code by performing a search for ancillary code relevant to the application.

At step 306, one or more of the systems described herein may package the ancillary code into a data volume container image to be deployed to the host system that hosts the application container. For example, packaging module 106 may, as part of computing device 202 in FIG. 2, package ancillary code 124 into data volume container image 126 to be deployed to host system 206 that hosts application container 122.

The term "data volume container," as used herein, generally refers to any container that contains one or more data volumes configured to be exposed to other containers. In some embodiments, a data volume container may be read-only and/or may contain data volumes that are exposed as read-only. In some examples, a data volume container may be and/or contain a named volume. In some embodiments, a data volume container may be treated by a container platform as a data volume in addition to or in place of being treated as a container. In some embodiments, multiple application containers may read from the same read-only data volume container. The term "data volume," as used herein, generally refers to any directory that stores one or more files that can be read by applications and/or processes. In some examples, a data volume may contain a combination of binaries, libraries, and/or configuration files.

Packaging module 106 may package the ancillary code in a variety of ways and/or contexts. For example, packaging module 106 may create a container image to host the ancillary code by copying from a base container image. In some embodiments, the ancillary code may be packaged into a container because the ancillary code may not be capable of executing independently.

In some examples, packaging module 106 may package a single piece of ancillary code, such as a plugin, in a data volume container image. In other examples, packaging module 106 may package multiple pieces of ancillary code intended for the same application into one data volume container image. In some embodiments, packaging module 106 may package multiple pieces of ancillary code into different data volumes that packaging module 106 then packages into a single data volume container image. In some examples, a data volume container may include only the ancillary code, resulting in a data volume container image that occupies the same amount of memory as the total memory occupied by the files in the ancillary code.

At step 308, one or more of the systems described herein may discover, by the application container, a pointer to a location of a data volume container instantiated from the data volume container image on the host system. For example, discovery module 108 may, as part of computing device 202 in FIG. 2, discover, by application container 122, a location of data volume container 128 on host system 206.

Discovery module 108 may discover the pointer to the location of the data volume container instantiated from the data volume container image in a variety of ways. In some embodiments, the application container and/or container platform that executes the application container may be configured with a script that discovers the location of the data volume container and/or data volume container image. In some examples, the data volume container image may be stored in the host system's container image cache and the data volume container image may be configured to instantiate the data volume container in a predetermined location. In some embodiments, discovery module 108 may discover the location of the data volume container image and may then instantiate a data volume container from the data volume container image before and/or when the application container is instantiated. In other embodiments, the container platform may instantiate the data volume container from the data volume container image as soon as the data volume container image is deployed and discovery module 108 may discover the location of the instantiated data volume container. In some examples, the application container may receive information about the instantiated data volume container but may receive no information about the data volume container image. In some embodiments, discovery module 108 may discover multiple data volumes within one data volume container. In some examples, discovery module 108 may discover all of the data volumes within a single data volume container.

For example, packaging module 106 may, as part of the application container, package the location of the data volume container image on the host system by configuring, at the creation of the static application container image, the static application container image with a script that scans for new ancillary code upon the application container being instantiated from the static application container image. In this embodiment, discovery module 108 may discover the location of the data volume container by the application container executing the script. In some embodiments, configuring the static application container image with the script that scans for the new ancillary code may include configuring the script to scan a predetermined directory and packaging the ancillary code into the data volume container image to be deployed to the host system that hosts the application container may include configuring the data volume container image to instantiate the data volume container in the predetermined directory on the host system. In this embodiment, discovering, by the script, the ancillary code may include discovering the data volume container in the predetermined directory. In some embodiments, discovery module 108 may discover and/or install the data volumes container before the application container is restarted and/or instantiated in order to minimize impact on the operation of the application.

Figure 4:
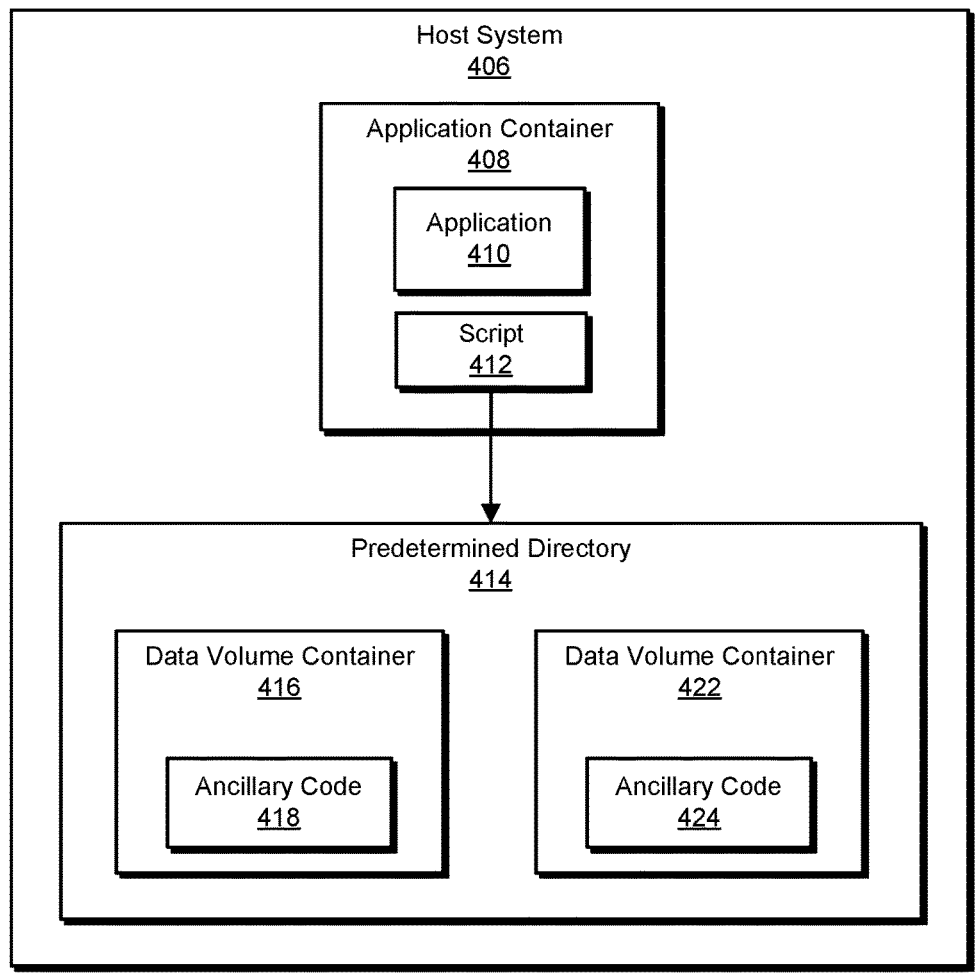
FIG. 4 is a block diagram of an example computing system for updating containers.

In some examples, the container may discover all instances of data volume containers and/or container images stored in the predetermined directory and/or may discover multiple data volume containers at once. For example, as illustrated in FIG. 4, an application container 408 may execute on a host system 406. In some examples, application container 408 may host an application 410 and/or be configured with a script 412. In one embodiment, whenever application 408 is instantiated, before application 410 is initiated, application container 408 may execute script 412 to search a predetermined directory 414 for data volume containers. In some examples, predetermined directory 414 may contain a data volume container 416 that contains ancillary code 418 and/or a data volume container 422 that contains ancillary code 424. In one example, script 412 may discover data volume container 416 and/or data volume container 422 and/or may apply ancillary code 418 and/or ancillary code 424 to application 410.

In one embodiment, packaging module 106 may package the data volume container image on the host system by configuring a container platform that instantiates the application container on the host system with a script that scans for new ancillary data upon instantiation of the application container by the container platform. In this embodiment, discovery module 108 may discover the location of the data volume container by the container platform executing the script while instantiating the application container. The term "container platform," as used herein, generally refers to any application, module, script, and/or code capable of executing a container. In some embodiments, a container platform may take a container image file as input and may launch the container from the image file. In some examples, a container platform may host data volumes and/or other data used by containers. In some embodiments, a container platform may include a container engine. For example, the container platform may be the DOCKER container engine.

In one embodiment, discovery module 108 may create a symbolic link between the location of the data volume container on the host system and a new location on the host system. In one example, discovery module 108 may create a symbolic link between the location of the data volume container and a location within the namespace of the application container. In some embodiments, the data volume container may include a script that creates the symbolic link. In some examples, the same script may create the symbolic link and install the ancillary code in the application container. By creating a symbolic link, the systems described herein may save memory and/or processing power over of copying the data volume container to a different directory. In some examples, the systems described herein may create symbolic links between the location of the data volume container and multiple other locations. For example, the systems described herein may create symbolic links to different application-specific directories where different application containers expect to find data volume containers. In some embodiments, the systems described herein may create symbolic links to read-only versions of the data volume container in order to preserve the integrity of the data volume container.

Returning to FIG. 3, at step 310, one or more of the systems described herein may modify, by the application container, the execution of the application executing in the application container with the ancillary code, without modifying the static application container image, at least in part by instantiating the application container with a pointer to the location of the data volume container that contains the ancillary code. For example, modifying module 110 may, as part of computing device 202 in FIG. 2, modify, by application container 122, the execution of application 208 executing in application container 122 with ancillary code 124, without modifying the static application container image 210, at least in part by instantiating application container 122 with a pointer to the location of data volume container 128 that contains ancillary code 124.

Modifying module 110 may modify the application with the ancillary code in a variety of ways. For example, modifying module 110 may modify the application with the ancillary code by applying the ancillary code to the application, in cases where the ancillary code is a hotfix, patch, plugin, or similar. In another example, modifying module 110 may modify the application with the ancillary code by executing the ancillary code in a way that enables the ancillary code to take actions that affect the application, such as reconfiguring the application, supplying the application with parameters, intercepting traffic to and/or from the application, restricting permissions of the application, and/or managing the application in other ways. In some examples, modifying module 110 may also update the application's data, configuration, and/or other settings that are not packaged in the data volume container image.

In some examples, modifying module 110 may modify the application container with the pointer to the location of the data volume container that contains the ancillary code by restarting the application container. For example, modifying module 110 may restart the container and may pass the location of the data volume container as a parameter to the command to restart the application container. In other examples, modifying module 110 may instantiate an application container that has not previously been executed and may instantiate the application with a pointer to the location of the data volume container. In some embodiments, modifying module 110 may modify the application with the ancillary code by running an installation script in a data volume stored in the data volume container. In some examples, modifying module 110 may run an installation script inside each of multiple data volumes stored within the same data volume container.

Figure 5:
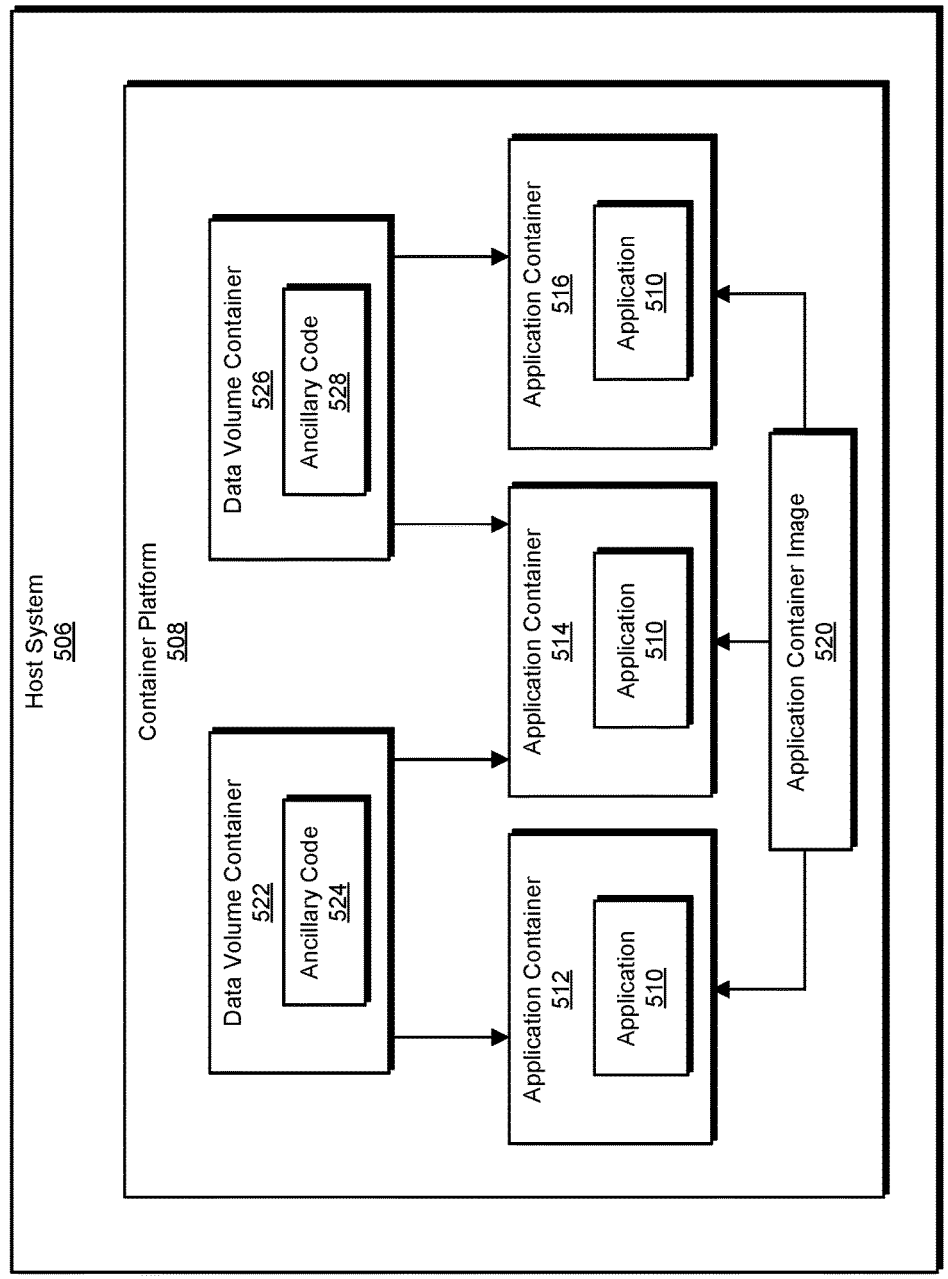
FIG. 5 is a block diagram of an example computing system for updating containers.

In some embodiments, different application containers executing instances of the same application may discover and/or modify applications using different ancillary code stored in different data volumes stored in different data volume container images and/or data volume containers instantiated from data volume container images. For example, as illustrated in FIG. 5, a host system 506 may host a container platform 508. In some examples, container platform 508 may host application containers 512, 514, and/or 516 that are all instantiated from an application container image 520 and/or all host instances of application 510. In one example, application container 512 may modify application 510 with ancillary code 524 after discovering data volume container 522, application container 516 may modify application 510 with ancillary code 528 after discovering data volume container 526, and/or application container 514 may modify application 510 with both ancillary code 524 and ancillary code 528 after discovering both data volume containers. In one example, ancillary code 524 may be a plugin that adds functionality useful to the tasks being performed by the instances of application 510 in application containers 512 and 514 but not application container 516, while ancillary code 528 may be a plugin that adds functionality useful to the tasks being performed by the instances of application 510 in application containers 514 and 516 but not application container 512.

In some embodiments, an application container that has previously discovered a data volume container may automatically rediscover that data volume container each time the application container is restarted. In some examples, the application container may automatically rediscover the previously discovered data volume containers even when restarting due to a new data volume container becoming available. For example, application container 514 may discover data volume container 522 and may modify application 510 with ancillary code 524. At a later time, application container 514 may be restarted and may discover data volume container 526. In some examples, application container 514 may also automatically rediscover data volume container 522 and may modify application 510 with both ancillary code 524 and ancillary code 528. In some embodiments, application container 514 may discover both data volume containers because both data volume containers may be stored in a predetermined directory. Additionally or alternatively, container platform 508 may track which data volume containers have been discovered by which application containers.

In some embodiments, the systems described herein may provide a user interface that may allow a user to add and/or subtract the data volume containers that are read from by each application container. In one embodiment, a data volume container that has been discovered by an application container may be automatically rediscovered by that application container on ever restart until a user removes the data volume container from the list of data volume containers associated with that application container. In some examples, a user may remove the data volume container in order to prevent a patch, plugin, hotfix, or other ancillary code from continuing to be applied to the application after the next time the application container is restarted. In one example, a user may change the version of a plugin, hotfix, or other ancillary code that is applied to an application by removing the data volume container with the currently applied version, adding a data volume container with a different version, and restarting the application container.

As discussed in connection with method 300 above, the systems and methods described herein may efficiently update application containers without creating new application container images by configuring the application container images and/or the container platform with a script that discovers relevant ancillary code whenever an application container is instantiated. In some examples, the ancillary code may be available to the application container every time the container is restarted until a user removes the ancillary code and/or the instructions to install the ancillary code. For example, a container may host a legacy application that requires a large number of patches to remain current and/or uses multiple plugins to add functionality that may not be necessary for all instances of the application. Rather than creating a new application container image each time a patch is released and/or for each instance of the application that uses different plugin configurations, the systems described herein may enable the application container to automatically discover and install the relevant patches and/or plugins on each restart by locating the ancillary code in a predictable location and/or tracking which ancillary code is applied to which container. By discovering and installing hotfixes, patches, and plugins in this way, the systems and methods described herein may support application containers that have a variety of different configurations and require a variety of updates without having to constantly create and deploy new application container images and without requiring administrators to manually apply patches and other code each time an application container is restarted.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating containers,
    at least a portion of the method being performed by a computing device comprising at least one processor, the method comprising:
    identifying an application container that is instantiated from a static application container image and that isolates a user space of an application that executes within the application container from other software on a host system while sharing a kernel space with the other software;
    identifying ancillary code that is designed to modify execution of the application executing in the application container;
    packaging the ancillary code into a data volume container image to be deployed to the host system that hosts the application container;
    discovering, by the application container, a pointer to a location of a data volume container instantiated from the data volume container image on the host system; and
    modifying, by the application container, the execution of the application executing in the application container with the ancillary code, without modifying the static application container image, at least in part by instantiating the application container with the pointer to the location of the data volume container that contains the ancillary code; and
    configuring, at the creation of the static application container image, the static application container image with a script that scans a predetermined directory for new ancillary code upon the application container being instantiated from the static application container image.

2. The computer-implemented method of claim 1, wherein discovering, by the application container, the pointer to the location of the data volume container on the host system comprises:
    discovering, by the application container executing the script, the pointer to the location of the data volume container.

3. The computer-implemented method of claim 1, wherein:
    configuring the static application container image with the script that scans for the new ancillary code comprises configuring the script to scan a predetermined directory;
    packaging the ancillary code into the data volume container image to be deployed to the host system that hosts the application container comprises configuring the data volume container image to instantiate the data volume container in the predetermined directory on the host system; and
    discovering, by the script, the ancillary code comprises discovering the data volume container in the predetermined directory.

4. The computer-implemented method of claim 1, wherein discovering, by the application container, the pointer to the location of the data volume container on the host system comprises:
    configuring a container platform that instantiates the application container on the host system with a script that scans for new ancillary data upon instantiation of the application container by the container platform; and
    discovering, by the container platform executing the script while instantiating the application container, the location of the data volume container.

5. The computer-implemented method of claim 1, wherein instantiating the application container with the pointer to the location of the data volume container that contains the ancillary code comprises restarting the application container.

6. The computer-implemented method of claim 1, further comprising:
    restarting the application container with an additional pointer to a location of a new data volume container that contains additional ancillary code;
    discovering, by the application container, the location of the new data volume container;
    automatically rediscovering, by the application container, the location of the data volume container on the host system; and
    modifying, by the application container, execution of the application executing in the application container with the ancillary code and the additional ancillary code.

7. The computer-implemented method of claim 1, wherein the ancillary code comprises a plugin to the application executing in the application container.

8. The computer-implemented method of claim 1, wherein the ancillary code comprises a patch to the application executing in the application container.

9. The computer-implemented method of claim 1, wherein discovering, by the application container, the location of the data volume container on the host system comprises creating a symbolic link between the location of the data volume container on the host system and a new location on the host system.

10. The computer-implemented method of claim 1, further comprising:

identifying a first application container that hosts a first instance of the application and a second application container that hosts a second instance of the application;

identifying additional ancillary code that is designed to modify the execution of the application;

packaging the additional ancillary code into an additional data volume container image;

discovering, by the first application container, a pointer to a location of an additional data volume container instantiated from the additional data volume container image; and modifying, by the first application container, the execution of the first instance of the application executing in the first application container with the additional ancillary code but not with the ancillary code;

modifying, by the second application container, the execution of the second instance of the application executing in the second application container with the ancillary code but not with the additional ancillary code.

11. The computer-implemented method of claim 1, wherein modifying, by the application container, the execution of the application executing in the application container with the ancillary code, comprises:

locating, by the application container, an installation script in a data volume within the data volume container; and executing the installation script.

12. A system for updating containers, the system comprising:

an identification module, stored in memory, that:
identifies an application container that is instantiated from a static application container image and that isolates a user space of an application that executes within the application container from other software on a host system while sharing a kernel space with the other software; and
identifies ancillary code that is designed to modify execution of the application executing in the application container;

a packaging module, stored in memory, that packages the ancillary code into a data volume container image to be deployed to the host system that hosts the application container;

a discovery module, stored in memory, that discovers, by the application container, a pointer to a location of a data volume container instantiated from the data volume container image on the host system;

a modifying module, stored in memory, that modifies, by the application container, the execution of the application executing in the application container with the ancillary code, without modifying the static application container image, at least in part by instantiating the application container with the pointer to the location of the data volume container that contains the ancillary code;

a configuration module, stored in memory, that configures, at the creation of the static application container image, the static application container image with a script that scans a predetermined directory for new ancillary code upon the application container being instantiated from the static application container image; and at least one physical processor that executes the identification module, the packaging module, the discovery module, the modifying module, and the configuration module.

13. The system of claim 12, wherein the discovery module discovers, by the application container, the pointer to the location of the data volume container on the host system by:
discovering, by the application container executing the script, the location of the data volume container.

14. The system of claim 12, wherein the discovery module:
configures the static application container image with the script that scans for the new ancillary code by configuring the script to scan a predetermined directory;
packages the ancillary code into the data volume container image to be deployed to the host system that hosts the application container by configuring the data volume container image to instantiate the data volume container in the predetermined directory on the host system; and
discovers, by the script, the ancillary code by discovering the data volume container in the predetermined directory.

15. The system of claim 12, wherein the discovery module discovers, by the application container, the pointer to the location of the data volume container on the host system by:
configuring a container platform that instantiates the application container on the host system with a script that scans for new ancillary data upon instantiation of the application container by the container platform; and
discovering, by the container platform executing the script while instantiating the application container, the location of the data volume container.

16. The system of claim 12, wherein the modification module instantiates the application container with the pointer to the location of the data volume container that contains the ancillary code by restarting the application container.

17. The system of claim 12, wherein:
the modification module restarts the application container with an additional pointer to a location of a new data volume container that contains additional ancillary code;
the discovery module:
discovers, by the application container, the location of the new data volume container; and
automatically rediscovers, by the application container, the location of the data volume container on the host system; and
the modification module modifies, by the application container, execution of the application executing in the application container with the ancillary code and the additional ancillary code.

18. The system of claim 12, wherein the ancillary code comprises a plugin to the application executing in the application container.

19. The system of claim 12, wherein the ancillary code comprises a patch to the application executing in the application container.

20. A non-transitory computer-readable medium comprising one or more computer-readable instructions that, when executed by at least one processor of a computing device, cause the computing device to:
identify an application container that is instantiated from a static application container image and that isolates a user space of an application that executes within the application container from other software on a host system while sharing a kernel space with the other software;

identify ancillary code that is designed to modify execution of the application executing in the application container;

package the ancillary code into a data volume container image to be deployed to the host system that hosts the application container;

discover, by the application container, a pointer to a location of a data volume container instantiated from the data volume container image on the host system; and modify, by the application container, the execution of the application executing in the application container with the ancillary code, without modifying the static application container image, at least in part by instantiating the application container with the pointer to the location of the data volume container that contains the ancillary code; and configure, at the creation of the static application container image, the static application container image with a script that scans a predetermined directory for new ancillary code upon the application container being instantiated from the static application container image.

* * * * *